(12) United States Patent
Pan

(10) Patent No.: US 10,123,141 B2
(45) Date of Patent: Nov. 6, 2018

(54) DOUBLE-TALK DETECTION FOR ACOUSTIC ECHO CANCELLATION

(71) Applicant: Bose Corporation, Framingham, MA (US)

(72) Inventor: Davis Y. Pan, Arlington, MA (US)

(73) Assignee: Bose Corporation, Framingham, MA (US)

( * ) Notice: Subject to any disclaimer, the term of this patent is extended or adjusted under 35 U.S.C. 154(b) by 51 days.

(21) Appl. No.: 14/940,495

(22) Filed: Nov. 13, 2015

(65) Prior Publication Data

US 2017/0142532 A1 May 18, 2017

(51) Int. Cl.
*H04R 29/00* (2006.01)
*H04M 9/08* (2006.01)
*G10K 11/178* (2006.01)

(52) U.S. Cl.
CPC ......... *H04R 29/001* (2013.01); *G10K 11/178* (2013.01); *H04M 9/082* (2013.01); *G10K 2210/3028* (2013.01); *G10K 2210/3055* (2013.01)

(58) Field of Classification Search
CPC ......... G10K 11/178; G10K 2210/3028; G10K 2210/3055; H04R 29/001
See application file for complete search history.

(56) References Cited

U.S. PATENT DOCUMENTS

| | | | |
|---|---|---|---|
| 6,804,203 B1 | 10/2004 | Benyassine et al. | |
| 7,046,794 B2 | 5/2006 | Piket et al. | |
| 7,333,605 B1 | 2/2008 | Zhang et al. | |
| 7,856,098 B1 | 12/2010 | Rossello | |
| 8,306,214 B2 | 11/2012 | Alves et al. | |
| 9,008,302 B2 | 4/2015 | Thapa et al. | |
| 2002/0114445 A1* | 8/2002 | Benesty | H04B 3/23 379/406.01 |
| 2006/0147032 A1 | 7/2006 | McCree et al. | |
| 2012/0263317 A1 | 10/2012 | Shin et al. | |

(Continued)

FOREIGN PATENT DOCUMENTS

| | | |
|---|---|---|
| GB | 2342832 A | 4/2000 |
| WO | 1998051066 A2 | 11/1998 |

OTHER PUBLICATIONS

Hakansson, L.: The Filtered-x LMS Algorithm; University of Karlskrona/Ronneby; 2004.

(Continued)

*Primary Examiner* — Ping Lee

(57) ABSTRACT

An acoustic echo canceller includes an adaptive filter and a double-talk detector. The adaptive filter includes a linear filter and a coefficient calculator. The linear filter has a transfer function that is controlled by a set of variable filter coefficients and that is configured to cancel an estimate of echo in a microphone signal to provide an output signal. The coefficient calculator is configured to update the set of variable filter coefficients based on a variable adaptation rate. The double-talk detector is configured to calculate changes in the energy of the variable filter coefficients (between updates of the coefficients). The acoustic echo canceller is configured to adjust the variable adaptation rate based on whether the energy of the variable filter coefficients is determined to be either oscillating or steadily changing (increasing or decreasing).

11 Claims, 4 Drawing Sheets

(56) References Cited

U.S. PATENT DOCUMENTS

2013/0129102 A1    5/2013  Li et al.
2017/0208170 A1*   7/2017  Mani .................... H04M 3/002
                                                379/406.01

OTHER PUBLICATIONS

Anonymous: Method for noncancelling taps for the early detection of double-talk in voice-echo cancellers; IP.com Electronic Publication: Aug. 6, 2003.
International Search Report and Written Opinion dated Feb. 8, 2017 for PCT/US2016/061348.

* cited by examiner

DOUBLE-TALK DETECTION FOR ACOUSTIC ECHO CANCELLATION

BACKGROUND

This disclosure relates to double-talk detection for acoustic echo cancellation.

SUMMARY

All examples and features mentioned below can be combined in any technically possible way.

In one aspect, an acoustic echo canceller includes an adaptive filter and a double-talk detector. The adaptive filter includes a linear filter and a coefficient calculator. The linear filter has a transfer function that is controlled by a set of variable filter coefficients and that is configured to cancel an estimate of echo in a microphone signal to provide an output signal. The coefficient calculator is configured to update the set of variable filter coefficients based on a variable adaptation rate. The double-talk detector is configured to calculate changes in the energy of the variable filter coefficients (between updates of the coefficients). The acoustic echo canceller is configured to adjust the variable adaptation rate based on whether the energy of the variable filter coefficients is determined to be either oscillating or steadily changing (increasing or decreasing).

Implementations may include one of the following features, or any combination thereof.

In some implementations, the double-talk detector is configured to determine a scale factor for adjusting the variable adaptation rate.

In certain implementations, the acoustic echo canceller is configured to calculate an adjusted adaptation rate as the product of the scale factor and a fixed adaptation value.

In some cases, the double-talk detector is configured to provide the scale factor to the adaptive filter, and the adaptive filter calculates the adjusted adaptation rate as the product of the scale factor and the fixed adaptation value.

In certain cases, the double-talk detector is configured to provide the scale factor to the coefficient calculator, and the coefficient calculator calculates the adjusted adaptation rate as the product of the scale factor and the fixed adaptation value.

In some examples, the double-talk detector is configured to calculate the adjusted adaptation rate as the product of the scale factor and the fixed adaptation value, and to provide the adjusted adaptation rate to the coefficient calculator.

In certain examples, the double-talk detector is configured to determine a trend of the energy of the variable filter coefficients and to compare a magnitude of the trend to a threshold value, and the acoustic echo canceller is configured to adjust the adaptation rate based on the comparison.

In some implementations, the double-talk detector is configured to determine a scale factor for adjusting the variable adaptation rate based on the comparison.

In certain implementations, the double-talk detector is configured to provide a first scale factor for adjusting the variable adaptation rate if the magnitude of a statistic based on the filter coefficient energy trend is greater than or equal to the threshold value, and to provide a second, different scale factor for adjusting the variable adaptation rate if the magnitude is less than the threshold value.

In some cases, the second scale value reduces the adaptation rate by a factor significantly less than 1, e.g., about 0.01 to about 0.05 (e.g., 0.025).

In certain cases, the first scale factor is 1, such that if the magnitude is greater than or equal to the threshold value the full adaptation value is used.

In some examples, the double-talk detector includes a lowpass filter for smoothing the trend of the energy of the variable filter coefficients, and the double-talk detector is configured to compute the magnitude of the smoothed trend.

In another aspect, an acoustic echo canceller includes an adaptive filter and a double-talk detector. The adaptive filter includes a linear filter and a coefficient calculator. The linear filter has a transfer function that is controlled by a set of variable filter coefficients and that is configured to cancel an estimate of echo in a microphone signal to provide an output signal. The coefficient calculator is configured to update the set of variable filter coefficients based on a variable adaptation rate. The double-talk detector is configured to determine a trend of the energy of the variable filter coefficients and to compare a magnitude of the trend to a threshold value. The acoustic echo canceller is configured to adjust the adaptation rate based on the comparison.

Implementations may include one of the above features, or any combination thereof.

DETAILED DESCRIPTION

Figure 1:
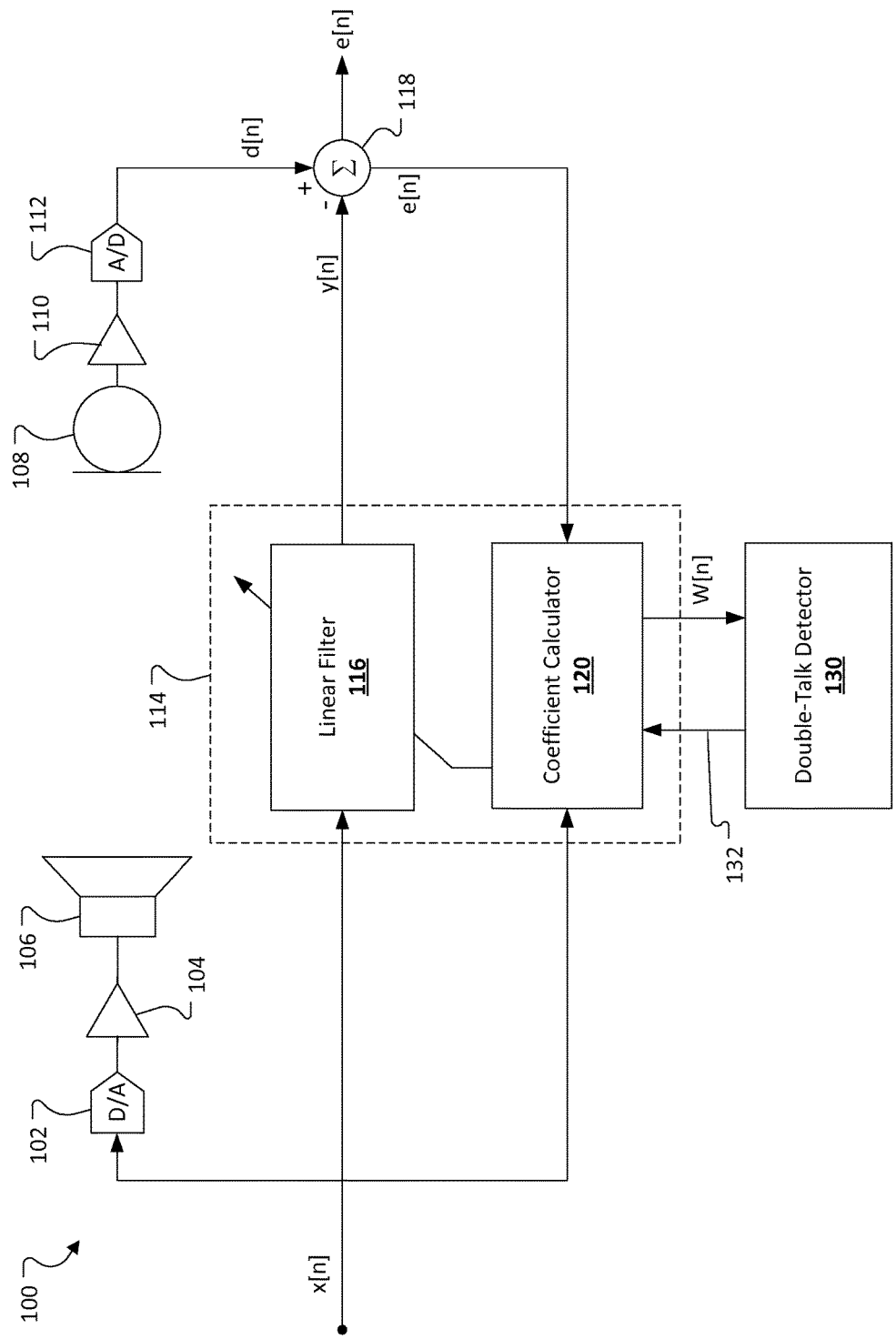
FIG. 1 is a diagram of an acoustic echo canceller.

Though the elements of several views of the drawing may be shown and described as discrete elements in a block diagram and may be referred to as "circuitry" or "modules", unless otherwise indicated, the elements may be implemented as one of, or a combination of, analog circuitry, digital circuitry, or one or more microprocessors executing software instructions. The software instructions may include digital signal processing (DSP) instruction. Unless otherwise indicated, signal lines may be implemented as discrete analog or digital signal lines. Multiple signal lines may be implemented as one discrete difficult signal line with appropriate signal processing to process separate streams of audio signals, or as elements of a wireless communication system. Some of the processing operations may be expressed in terms of the calculation and application of coefficients. The equivalent of calculating and applying coefficients can be performed by other analog or DSP techniques and are included within the scope of this patent application. Unless otherwise indicated, audio signals may be encoded in either digital or analog form; conventional digital-to-analog and analog-to-digital converters may not be shown in circuit diagrams.

An acoustic echo canceller (AEC) is used in systems where there is need to remove sound from a loudspeaker picked up by a nearby microphone. AEC uses an adaptive filter to model the transfer function between the loudspeaker input to the microphone output. Once the filter converges, the filter output closely matches the loudspeaker sound picked up by the microphone when the loudspeaker input signal is fed through the filter. Thus when the filter output is subtracted from the microphone signal, the loudspeaker component of the microphone signal is cancelled.

The difference between the microphone signal and the filter output is used in updating the adaptive filter coefficients (a/k/a "adaptive filter weights"). If the loudspeaker output is the only sound picked up by the microphone, this difference is the transfer function modeling error. An appropriately tuned adaptive filter will quickly converge to minimize the error and accurately model the correct transfer function. If the microphone signal contains significant interfering sounds, they will tend to inhibit the ability of the adaptive algorithm to converge to an accurate model of the transfer function.

For example, if the speaker and microphone are part of a hands-free speakerphone, the presence of near-end speech concurrent to far-end speech will cause a disruption in the convergence of the filter. This scenario is known as double-talk. To inhibit misalignment of the filter, it can be beneficial to slow or disable the adaptation of the filter whenever double-talk is detected.

There are many prior art approaches to determining when double-talk occurs, but many use the same general approach, which is to use a detection statistic formulated from the signal sent to the loudspeaker (x[n]), the microphone signal (d[n]), and/or the adaptive filter error signal (e[n]) (a/k/a the "output signal"). This detection statistic is compared to a threshold to determine if a double-talk condition exists. Such methods will tend to degrade in performance when there is significant uncorrelated noise in the microphone signal. This is often the case when applying acoustic echo cancellation in a vehicle because of almost continuous road, drivetrain, and wind noise.

The systems and methods described herein utilize a different statistic based on the behavior of the energy of the adaptive filter coefficients. The idea being that if the energy of the adaptive filter weights is consistently increasing or decreasing, then the filter is most likely converging towards a solution or diverging. If the energy of the weights is oscillating, the filter is either already converged or disrupted by a double-talk condition. In either case where the energy is oscillating, the adaptation should be slowed or disabled.

FIG. 1 is a diagram of an acoustic echo canceller 100. In an output path, a far from-end audio signal x[n], which represents audio received from a far-end (remote) source, is converted digital form to an analog signal by a digital-to-analog (D/A) converter 102, amplified by a power amplifier 104, and transduced to acoustic energy via a speaker 106.

In an input path, a microphone 108 receive an acoustic input from a near-end (local) source. The acoustic input can include speech from a near-end user, near-end ambient noise, and echo from the speaker 106. The signal from the microphone 108 is amplified by an amplifier 110 and converted from analog to digital form via an analog-to-digital (A/D) converter 112 to provide a microphone signal d[n].

An adaptive filter 114 receives the far-end audio signal x[n] and the microphone signal d[n] and generates an output signal y[n]. The adaptive filter 114 filters the far-end audio signal x[n] with a linear filter 116 to provide an estimate of the echo in the microphone signal d[n]. The estimate of the echo y[n] is then subtracted from the microphone signal d[n] to by a summer 118 to obtain the error signal e[n]. The error signal e[n] is then fed back to a coefficient calculator 120 to update a set of filter coefficients W[n] of the linear filter 116. The error signal e[n] also represents the output that is transmitted back to the far-end source for reproduction to a far-end user.

The linear filter 114 may be implemented as a finite impulse response (FIR) filter that has a transfer function which is determined by the filter coefficients W[n]. The coefficient calculator 120 updates the filter coefficients based on an adaptive algorithm. Suitable adaptive algorithms for use by the coefficient calculator 120 may be found in *Adaptive Filter Theory, 4th Edition* by Simon Haykin, ISBN 013091261, and include a least mean square (LMS) or an extended least mean square (XLMS) algorithm. The filter coefficients W[n] are adjusted based on an adaptation rate μ[n] (a/k/a "step size").

The acoustic echo canceller 100 includes a double-talk detector 130 for detecting the presence of double-talk. Double-talk refers to a situation in which both near-end audio and far-end audio are present, such as when both parties to a telephone call are talking at the same time. The double-talk detector 130 receives, as an input from the coefficient calculator 120, the filter coefficients W[n], which are used to detect the presence of double-talk.

Specifically, the double-talk detector 130 detects the presence of double-talk based on the energy of the filter coefficients W[n]. The idea being that if the energy of the filter coefficients W[n] Is consistently increasing or decreasing, then the adaptive filter 114 is most likely converging towards a solution or diverging. If the energy of the filter coefficients W[n] instead is oscillating, then the adaptive filter 114 has either already converged or is disrupted by a double-talk condition. In either case, the adaptation should be slowed or disabled.

The double-talk detector 130 then provides a control signal 132 back to the coefficient calculator 120. The coefficient calculator 120 uses this control signal 132 to calculate the filter coefficients for a subsequent sample period.

Figure 2:
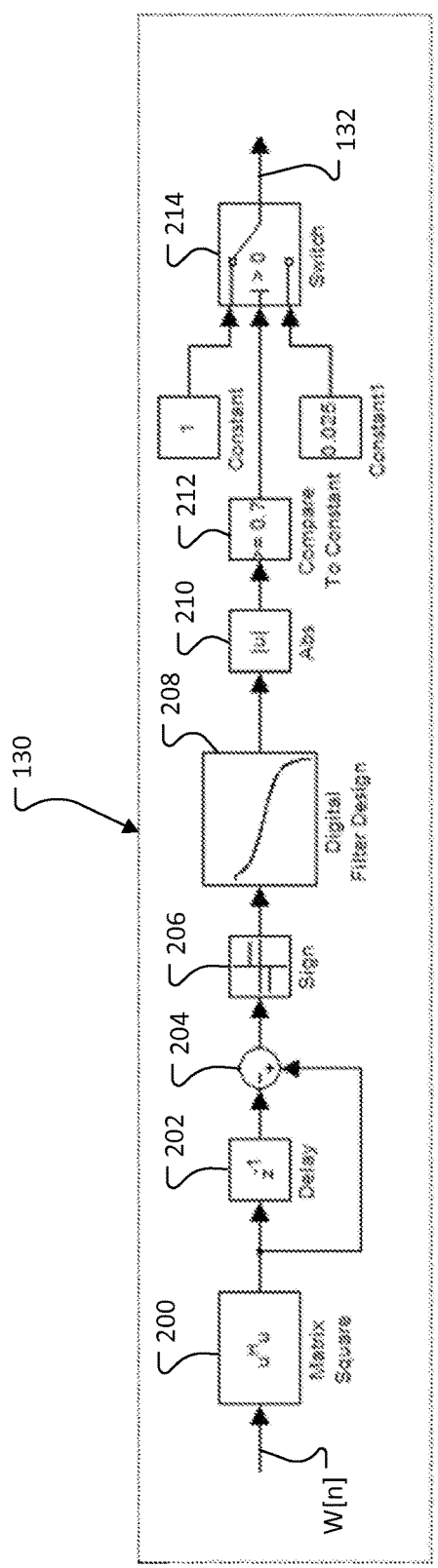
FIG. 2 is a diagram of a double-talk detector from the acoustic echo canceller of FIG. 1.

FIG. 2 is a diagram of an implementation of the double-talk detector 130. The double-talk detector 130 includes an energy computation module 200 which computes the energy of the filter coefficients W[n]. The next two modules (i.e., delay 202 and summer 204) compute the energy difference between the current and immediate past set of filter coefficients. A sign module 206 determines if the energy is increasing or decreasing regardless of the magnitude of the difference. A low pass filter 208 is provided to smooth the trend of the filter coefficient energy. Next, a magnitude computation module 210 computes the magnitude of the trend and a comparator 212 compares the calculated magnitude to a threshold value. The output of the comparator 212 is used to set a scale factor for the adaptation rate of the adaptive filter 114 via a switch 214. If the calculated magnitude is above or equal to the threshold value, then the scale factor is set to 1 so that full adaptation rate is used. If the calculated magnitude is below the threshold value, then the adaptation rate is reduced by a predetermined value. In one example, that predetermined value may be about 0.01 to about 0.05 (e.g., 0.025).

In the illustrated example, the output of the double-talk detector 130 is the scale factor. That is, the control signal 132 represents the scale factor. The coefficient calculator 120 can then use the scale factor to calculate an updated adaptation rate as the product of the scale factor and the present value of the adaptation rate.

Alternatively, the coefficient calculator 120 may provide the current value of the adaptation rate to the double-talk detector 130, and the double-talk detector 130 may calculate the updated adaptation rate using the determined scale factor and the current value of the adaptation rate. In that case, the control signal 132 may represented the updated adaptation rate.

Figure 3:
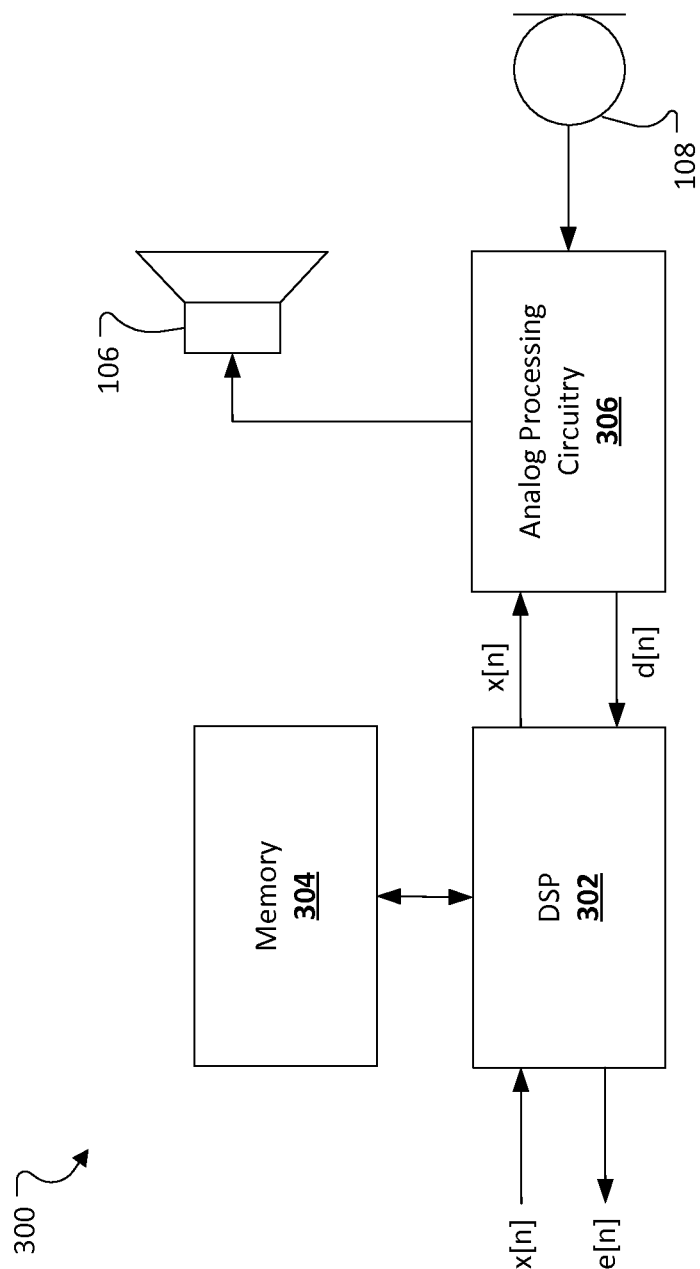
FIG. 3 is a diagram of an acoustic echo cancellation system for implementing the acoustic echo canceller of FIG. 1.

FIG. 3 is a diagram of an implementation of an acoustic echo cancellation system 300. In this implementation, the system 300 includes a digital signal processor (DSP) 302, a memory 304, analog processing circuitry 306, the speaker 106, and the microphone 108. The DSP 302 may be configured to implement the adaptive filter 114 and the double-talk detector 130, shown in FIG. 1. The memory 304 provides storage for program codes and data used by the DSP 302. The analog processing circuitry 306 performs the analog processing and may include the D/A converter 102 and power amplifier 104 in the output path and amplifier 110 and A/D converter 112 in the input path.

Figure 4:
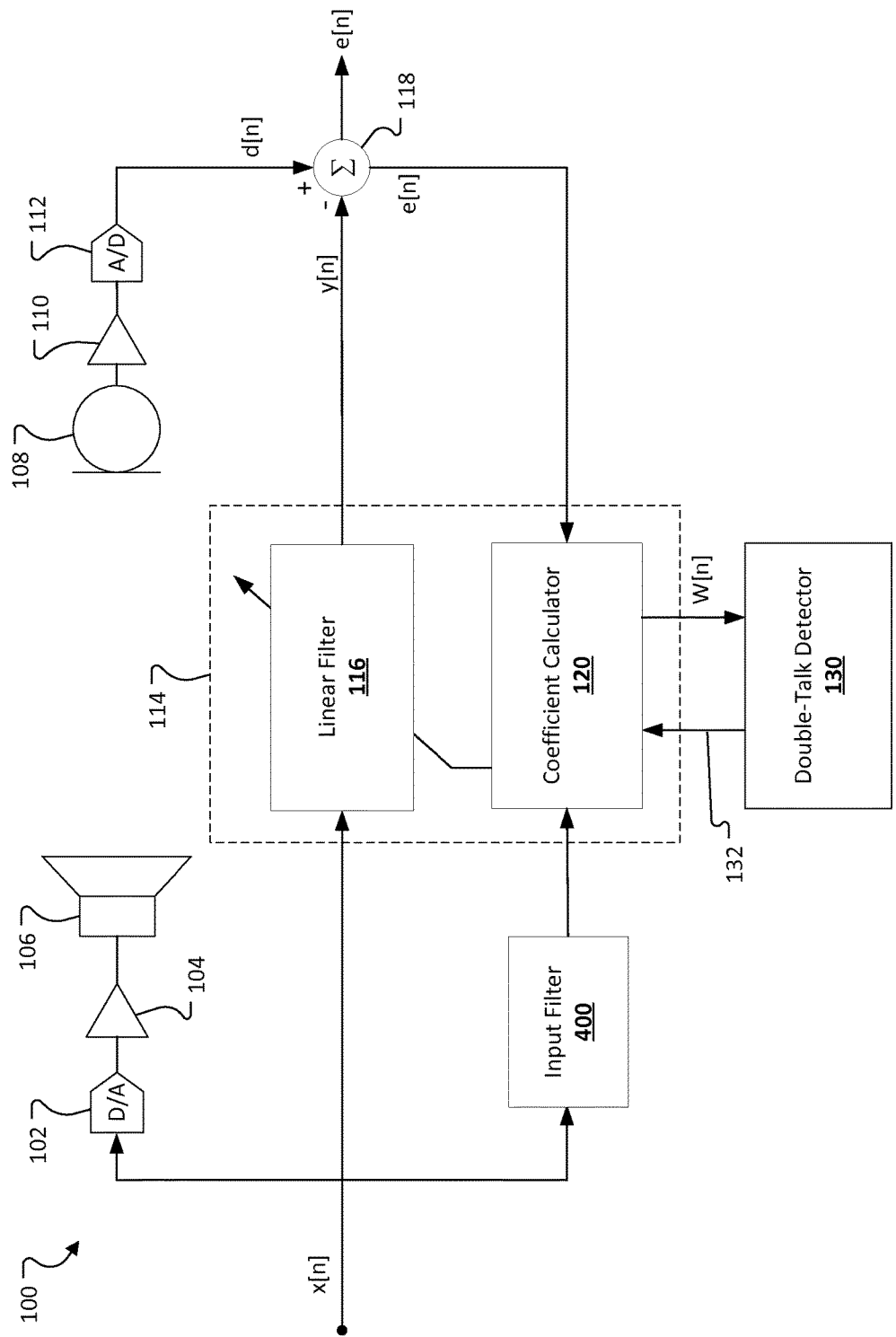
FIG. 4 is a diagram illustrating another implementation of an acoustic echo canceller.

With reference to FIG. 4, the acoustic echo canceller 100 may also include an input filter 400. The input filter 400, which is characterized by a transfer function, compensates for effects in the energy transduced by the microphone 108 of components of the acoustic echo canceller 100 (including the power amplifier 104 and the speaker 106) and of the environment in which the acoustic echo canceller 100 operates. In the illustrated implementation, the input filter 400 receives the x[n] and provides a filtered input signal x'[n] to the coefficient calculator 120. The coefficient calculator 120 then uses this filtered input signal x'[n] in the calculation of the filter coefficients W[n]. The use of this input filter for an adaptive filter 114 based on Least Mean Squares error criteria is commonly known as the filtered-x LMS approach.

A number of implementations have been described. Nevertheless, it will be understood that additional modifications may be made without departing from the scope of the inventive concepts described herein, and, accordingly, other implementations are within the scope of the following claims.

What is claimed is:

1. An acoustic echo canceller comprising:
    an adaptive filter comprising:
        a linear filter having a transfer function controlled by a set of variable filter coefficients and configured to cancel an estimate of echo in a microphone signal to provide an output signal, and
        a coefficient calculator configured to update the set of variable filter coefficients based on a variable adaptation rate; and
    a double-talk detector configured to calculate changes in the energy of the variable filter coefficients, determine a trend of the changes in the energy of the variable filter coefficients, and compare a magnitude of the trend to a threshold value,
    wherein the acoustic echo canceller is configured to adjust the variable adaptation rate using a first value if the magnitude of the trend is greater than or equal to the threshold value, otherwise, using a second, different value to adjust the variable adaptation rate,
    wherein the second value is a non-zero value,
    wherein calculating the changes in the energy of the set of variable filter coefficients comprises computing the energy difference between a current set of variable filter coefficients of the linear filter and a past set of variable filter coefficients of the linear filter,
    wherein each of the first value and the second value is a respective scale factor for adjusting the variable adaptation rate,
    wherein the acoustic echo canceller is configured to calculate an adjusted adaptation rate as the product of the scale factor and a fixed adaptation value.

2. The acoustic echo canceller of claim 1, wherein the double-talk detector is configured to provide the scale factor to the adaptive filter, and wherein the adaptive filter calculates the adjusted adaptation rate as the product of the scale factor and the fixed adaptation value.

3. The acoustic echo canceller of claim 2, wherein the double-talk detector is configured to provide the scale factor to the coefficient calculator, and wherein the coefficient calculator calculates the adjusted adaptation rate as the product of the scale factor and the fixed adaptation value.

4. The acoustic echo canceller of claim 1, wherein the double-talk detector is configured to calculate the adjusted adaptation rate as the product of the scale factor and the fixed adaptation value, and to provide the adjusted adaptation rate to the coefficient calculator.

5. The acoustic echo canceller of claim 1, wherein the second value reduces the adaptation rate by a factor significantly less than 1.

6. The acoustic echo canceller of claim 1, wherein the first value is 1, such that if the magnitude is greater than or equal to the threshold value the full adaptation value is used.

7. The acoustic echo canceller of claim 1, wherein the double-talk detector comprises a lowpass filter for smoothing the trend of the energy of the variable filter coefficients, and wherein the double-talk detector is configured to compute the magnitude of the smoothed trend.

8. The acoustic echo canceller of claim 1, wherein the double-talk detector comprises:
    a delay;
    a summer, wherein the delay and the summer are configured to compute the energy difference between the current and immediate past set of filter coefficients;
    a sign module configured to determine if the energy is increasing or decreasing regardless of the magnitude of the difference;
    a low pass filter configured to smooth the trend of the filter coefficient energy;
    a magnitude computation module configured to compute a magnitude of the trend;
    a comparator configured to compare the magnitude of the trend to the threshold value; and
    a switch, wherein an output of the comparator is used to set the scale factor for the adaptation rate of the adaptive filter via the switch.

9. The acoustic echo canceller of claim 8, wherein if the calculated magnitude is above or equal to the threshold value, then the scale factor is set to 1 so that full adaptation rate is used, and if the calculated magnitude is below the threshold value, then the adaptation rate is reduced by a predetermined value from 0.01 to 0.05.

10. An acoustic echo canceller comprising:
    an adaptive filter comprising:
        a linear filter having a transfer function controlled by a set of variable filter coefficients and configured to cancel an estimate of echo in a microphone signal to provide an output signal, and
        a coefficient calculator configured to update the set of variable filter coefficients based on a variable adaptation rate; and
    a double-talk detector configured to compare the energy of current variable filter coefficients of the linear filter with the energy of previous variable filter coefficients of the linear filter to detect the presence of double-talk,
    wherein comparing the energy of current variable filter coefficients of the linear filter with the energy of previous variable filter coefficients of the linear filter comprises computing the energy difference between the current variable filter coefficients and the previous variable filter coefficients, and wherein the acoustic echo canceller is configured to adjust the adaptation rate based on the comparison, wherein the acoustic echo canceller is configured to calculate an adjusted adaptation rate as the product of a fixed adaptation value and one of a plurality of scale factors, wherein none of the scale factors equals to zero.

11. The acoustic echo canceller of claim 10, wherein the acoustic echo canceller is configured to use one of a plurality of scale factors to adjust the adaptation rate based on the comparison.

\* \* \* \* \*